March 26, 1940. D. A. WALLACE ET AL 2,195,058
CRANKSHAFT LAPPING MACHINE
Original Filed Oct. 7, 1937
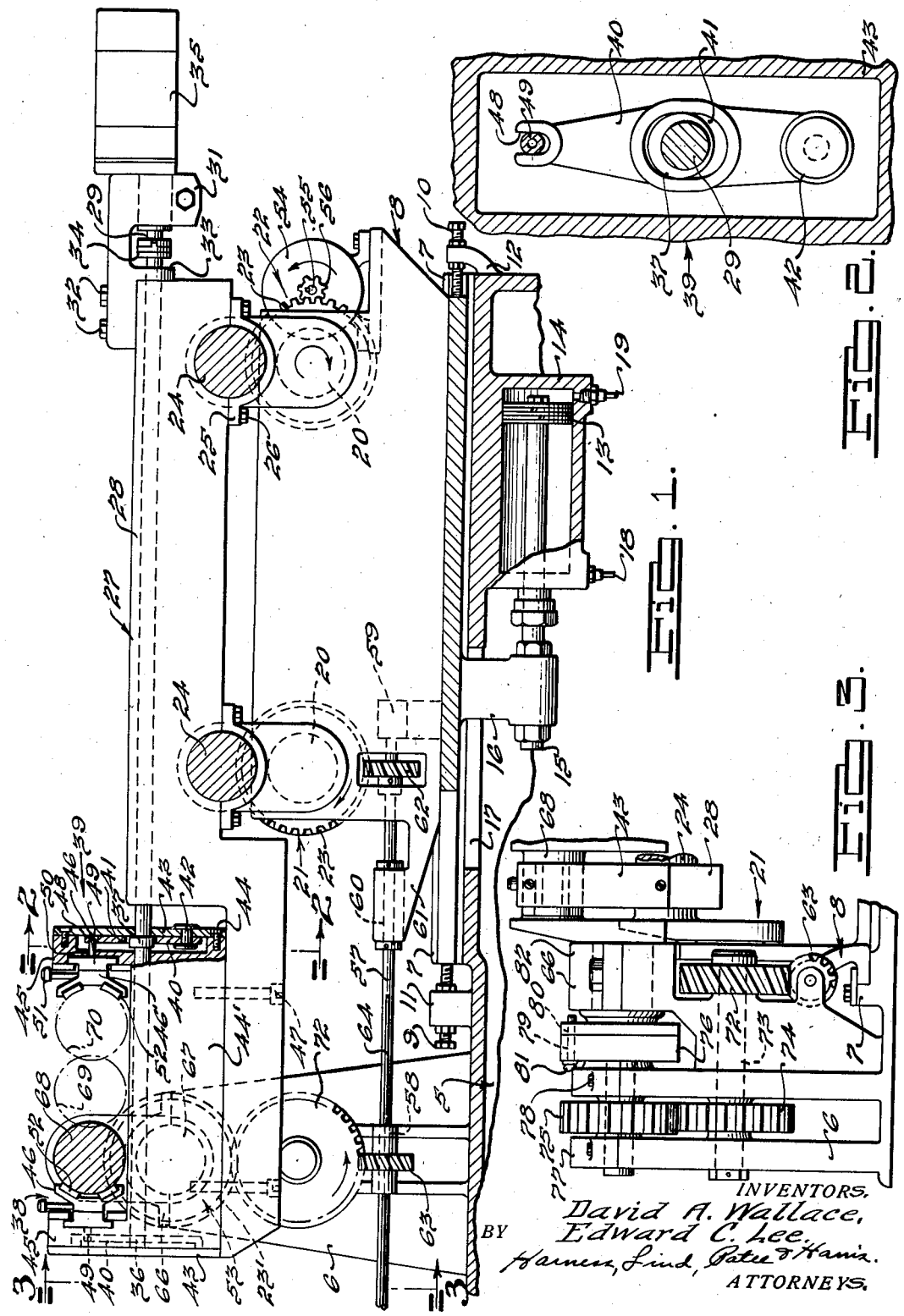
INVENTORS.
David A. Wallace,
Edward C. Lee,
BY Harness, Lind, Pate & Harris.
ATTORNEYS.

Patented Mar. 26, 1940

2,195,058

UNITED STATES PATENT OFFICE 2,195,058

CRANKSHAFT LAPPING MACHINE

David A. Wallace and Edward C. Lee, Detroit, Mich., assignors to Chrysler Corporation, Highland Park, Mich., a corporation of Delaware Application October 7, 1937, Serial No. 167,805
Renewed December 28, 1939

17 Claims. (Cl. 51—59)

This invention relates to improved crankshaft bearing lapping apparatus and is a further development of our invention disclosed in the copending application Serial 107,377, filed October 24, 1936.

More particularly, the invention pertains to the provision of an improved apparatus for lapping the crank throw bearings of multiple throw crankshafts of the character used in multiple cylinder, internal combustion engines, compressors and the like.

It is an object of the invention to provide an improved crankshaft lapping machine by which the crank throw bearings of a multiple throw crankshaft may be subjected alternately to the action of a rough and a finish lapping element during rotation of such bearings in their normal manner and while the lapping elements are reciprocated axially of the bearings at a rate substantially of a vibratory order.

Another object of the invention resides in the provision of a lapping apparatus of the character shown and described in the copending application Serial 107,377 hereinbefore referred to, in which each of the lapping tools may be employed to operate a pair of lapping elements selectively into and out of lapping engagement with a crank throw bearing of the crankshaft for respectively rough lapping and finish lapping said bearing.

A further object of the invention is to provide in an apparatus of this character, an individual lapping tool for each bearing of a crankshaft which is yieldably urged toward the bearing it operates upon with a uniform and predetermined force during rotation of the crankshaft in its normal manner.

Further objects of the invention are to provide mechanism for causing the working ends of the tools which operate upon the crank throw bearings to follow the paths of the latter during rotation of the crankshaft without supporting the tools on the crankshaft or relying upon the coaction between the crankshaft and the tools to drive the crankshaft or the tools, one by or from the other, so as to guard against variation of the pressure by which the working ends of the tools are applied to the bearings by the aforesaid yieldable tool urging means; and to provide a lapping device which embraces and operates upon one half or less than one half of the circumference of each bearing in order to accommodate removal of lapping device from and replacement thereof on the bearings by relative movements of the devices away from and toward the axis of the crankshaft sections.

Still further objects of the invention are to provide a unitary assembly of all the tools, having a rough and a finish lapping device, on a common shiftable support by which they may be simultaneously moved into and out of selective rough and finish lapping operative relationship with respect to the crankshaft constituting the work; to provide means for indexing the crankshaft operated upon with respect to the tool carrying and driving apparatus and to so drivingly connect the work crankshaft and the tool carrying apparatus as to maintain synchronism between the movements of the ends of the tools and the respective crank throw bearings upon which they operate, in order that the tools may be retracted from their respective bearings of the crankshaft and replaced thereon, or on corresponding bearings of another crankshaft.

Other objects of the invention are to provide on the respective lapping tools, each having a rough and finish lapping element, individual driving means for reciprocating these groups of rough and finish lapping elements relative to the main body portions of the tools at a comparatively high rate; to provide a pair of master crankshafts which are substantially identical to the crankshaft to be lapped for supporting the tools; and to provide a positive interconnecting driving mechanism between the master crankshafts and the work supporting driving mechanism which synchronizes the master crankshafts with the work and provides for the supporting of substantially the entire weight of the rough and finish device equipped tools independently of the work.

Other objects and advantages of the invention will be more apparent from the following description taken in connection with the accompanying drawing, in which:

Fig. 1 is a side elevational view, partly in section and having portions removed, of a crankshaft lapping machine embodying the invention.

Fig. 2 is an enlarged vertical sectional view taken as indicated by the line 2—2 of Fig. 1.

Fig. 3 is a partial end elevational view taken approximately as indicated by the line 3—3 of Fig. 1.

The lapping apparatus illustrated in the drawing comprises a stationary machine bed 5 having an extension 6 for rotatably supporting the crankshaft to be lapped on its normal axis and having horizontal guides 7 for supporting a shiftable carriage portion 8. Adjustable stops 9 and 10 are carried by brackets 11 and 12 respectively formed on the bed 5 to limit the travel of the carriage 8, as will presently be more apparent. The carriage 8 may be moved in its normal course of travel by a piston 13 operating within a fluid pressure cylinder 14 supported by the bed 5, a piston rod 15 being rigidly fixed to the tool carriage 8 by an extension 16 protruding through an elongated slot 17 in the bed 5. The interior of the cylinder 14 is communicatively connected with a source of fluid pressure by conduits 18 and 19 which, under the control of valve mechanism (not shown) applies fluid pressure to either end of the cylinder 14 so as to move the tool carriage 8 selectively to the right or left with a predetermined pressure.

The carriage 8 rotatably supports the main bearings 20 of master crankshafts 21 and 22 having gears 23 thereon. These crankshafts 21 and 22 are mounted in the same horizontal plane and are substantially identical in construction, particularly as to their crank throw angularity, with the crankshaft to be lapped.

Each of the crank throw bearings 24 is journalled in a bearing block 25 detachably secured by bolts 26 to a shiftably mounted lapping tool, generally designated by the numeral 27. There are preferably as many bearing blocks 25 and tools 27 as there are crank throw bearings on each of the crankshafts 21 and 22. Each lapping tool 27 is adapted to operate upon one of the crank throw bearings of the crankshaft to be lapped. Each tool 27 comprises a movable body portion 28 on which is journaled a lapping element driving shaft 29, the shaft 29 normally being disposed above the crankshafts 21 and 22 and its axis being substantially perpendicular to the plane of rotation of the crank throw bearings of the latter. The shaft 29 is also journaled in a slotted bracket 31 detachably secured by bolts 32 to the tool body portion 28. The bracket 31 has formed therein a recess 33 for accommodating a coupling member 34 by which the shaft 29 is connected with the shaft of a prime mover 35 which is secured to the bracket 31 and which imparts a drive to the shaft 29.

The other end portion of the shaft 29 has drivingly connected thereto a pair of spaced eccentrics 36 and 37 which rotate within eccentric followers of identical lapping element carriers 38 and 39 positioned in spaced facing relationship. These carriers 38 and 39 each have a lever member 40 which has an eccentric follower slot 41 in which one of the eccentrics 36 and 37 operates.

One extremity of each lever member 40 is pivotally attached at 42 to a supporting plate 43 which is held by screws 44 to a support 44' having end flanges 45 provided with dove-tailed channel ways in which a slide block 46 is reciprocably mounted. The support 44' is detachably secured to the body portion 28 of the tool by screws 47. The other extremity of the member 40 is provided with a slot 48 in which is received a pin extending through an elongated slot 50 in the flange 45, the pin 49 being carried by the slide block 46. A lapping element holder 46' is pivotally and detachably mounted on each slide block 46 by a removable pin 51 and provided with lapping elements 52 which comprise natural stone, compressed abrasive material, or other suitable lapping substance.

Rotation of the shaft 29 and the eccentrics 36 and 37 imparts reciprocatory travel to the slide block 46 and to the lapping elements 52 of substantially vibratory order in a path parallel with the normal axes of the crankshafts 21 and 22. The working sides of the lapping elements are preferably formed to conform to the curvature of the corresponding crank throw bearing of the crankshaft to be lapped and extend around less than one-half of the circumference of the crank throw bearing to facilitate removal and adjustment.

A rotatable support is provided for the work crankshaft 53 by a bearing block 66 which is detachably secured to the upper portion of the extension 6, the work crankshaft's normal axis being parallel with that of the master crankshafts 21 and 22. The crankshaft 53 is so supported on its main bearing 67 by the extension 6 that the respective crank throw bearings 68 are positioned in lapping receiving relationship with respect to the lapping elements 52.

The master crankshafts 21 and 22 and the work crankshaft, generally designated by the numeral 53, are drivingly rotated in synchronism with each other by driving mechanism mounted on the bed 5 and the carriage 8. This driving mechanism comprises a motor 54 having a shaft 55 on which a pinion 56 is mounted. The teeth of the pinion 56 are meshed with the teeth of the gear 23 of the crankshaft 22. A shaft 57, drivingly connected with the gear 23 of the crankshaft 21, is journaled at 58 on the extension 6, and at 59 and at 60 on a bracket 61 carried by the carriage 8. One end portion of the shaft 57 has fixed thereto a worm gear 62 which is in constant mesh with the gear 23 of the crankshaft 21. The other end portion of the shaft 57 is slidably and non-rotatably splined at 64 in a worm gear 63 which is held against movement axially of the shaft by thrust bearings 68.

The worm 63 is in constant engagement with a gear 72 (best shown in Fig. 3) drivingly connected to a shaft 73 rotatably supported by the extension 6. The other end portion of the shaft 73 has fixed thereto a gear 74 which is in mesh with a gear 75 drivingly supported by a flanged cylinder guide member 76 supported parallel to the shaft 73 by bearing blocks 77 being secured to the extension 6 by bolts 78. The flange portion of the member 76 has an aperture 79 which is adapted to successively align with a plurality of annularly arranged apertures 80 normally formed in the attaching flange of the work crankshaft 53. An indexing pin 81 is adapted to be inserted through the aperture 79 and one of the apertures 80. One of the main bearings of the work crankshaft 53 is supported by the extension 6 between a bearing block 52.

In unloading the work crankshaft the pin 81 is removed from the indexed aperture 80 of the work crankshaft, after the apparatus is stopped, and the bearing cap 82 is removed to permit lifting the work crankshaft off the extension 6. To place another work crankshaft in lapping receiving relationship with the lapping apparatus the operator positions the crankshaft on the extension 6 and rotatably secures it with the bearing block 82, and then inserts the pin 81 into the proper indexing aperture 80. The operator can readily determine which is the proper aperture 80 of the work crankshaft by bringing the crank throw bearings of the work crankshaft into the same angular positions as the crank throw bearings of the master crankshafts.

Relative adjustment may be made of the lapping elements 52 carried by the carriers 38 and 39 with respect to the crank throw bearings 68 of the work. The lapping elements 52 of the carriers 38 are preferably of material for rough lapping and bearings 68 and those of the carriers 39 are preferably for finish lapping thereof. When the tool 27 and the carriage 8 are in their illustrated positions, determined by the valved pressure within the cylinder 14, the bearings 68 are in lapping engagement with the rough lapping elements of the carriers 38; when at a position with the bearings 68 midway between the carriers 38 and 39, as indicated at 69, the bearings 68 are entirely out of engagement with both lapping elements of these carriers to facilitate removal or loading of the crankshaft 53 on the machine, and the lapping elements may be removed or inspected. When the lapping elements are at a relative position with respect to the bearings 68, as indicated at 70, the bearings are in lapping engagement with the finish lapping elements of the carrier 39. The horizontal adjustment of the tool carriage 8 and tool 27 by the piston within the cylinder 14 thereby causes simultaneous disengagement and engagement of all the lapping elements of the carrier 38 or 39 with respect to their associated crank throw bearings 68 of the work crankshaft 53.

By virtue of the foregoing construction, substantially the entire weight of each lapping tool is supported by the carriage 8 and the lapping elements 52 of each tool 27 which operate upon the crank throw bearings 24 of the work crankshaft 53 are controlled in their movement so as to follow the paths of movement of the crank throw bearings 24. By driving the work crankshaft 53 from the master crankshafts 21 and 22 through the medium of the shaft 57, the lapping tools 27 are not relied upon to drivingly connect the work crankshaft 53 with either of the master cranks. This enables the use of lapping elements on the working ends of the lapping tools which embrace not more than one-half of the circumference of the bearings and guard against the application of uniform pressure on the lapping elements. The lapping elements are yieldably urged at a predetermined pressure against the associated bearings of the work crankshaft with uniform pressure by the valved fluid pressure admitted into the cylinder 14. Lapping elements of this character which do not embrace more than one-half of the bearings also facilitate convenient removal and application of the lapping elements from and to the work crankshaft respectively.

When a work crankshaft is mounted on the extension 6 of the lapping machine, the crank throws thereof are so indexed by the pin 81 in the proper aperture 80 with respect to the crank throws of the master crankshafts 21 and 22 and the ends of the lapping tools 27 as to permit each lapping tool to be brought into proper operative engagement with its associated bearing by merely adjusting the lapping tool and the carriage 8 with the piston 13 and without requiring manual adjustment or setting of the working ends of the lapping tools 27 with respect to those bearings upon which they operate.

During operation of the improved crankshaft lapping machine, the work crankshaft 53 is rotated while the lapping elements 52 of the carriers 38 or 39 are in operative engagement with the crank throw bearing 68 thereof for rough or finish lapping respectively, and the lapping elements are reciprocated axially of the crankshaft 53 at a comparatively high rate of speed of a substantially vibratory order. These groups of lapping elements are selectively urged with a predetermined pressure by horizontal shifting of the tools 27 and the carriage 8 controlled by the proper admittance of fluid pressure into the cylinder 14.

The resultants of the reciprocatory movement of the lapping element and the rotative movement of the bearing relative thereto during each direction of reciprocation of the lapping element extend at opposite inclinations with respect to each other. It is preferable to so predetermine the velocities of these rotative and reciprocatory movements as to cause the resultants of the movements produced during successive half cycles of the reciprocatory movement to intersect at substantially right angles to each other. However, since the velocity of the reciprocatory movement varies, this condition is not maintained at all times but is approached throughout the main portion of the strokes of the lapping elements.

Localized hard areas of the lapping surfaces, therefore, trace inscriptions, of a microscopic order, on the surface of the work during successive half cycles of the reciprocatory movement which are cross-hatched at a plurality of different angles forming a heterogeneous arrangement of cross-hatched scratch lines, none of which develop into deep grooves or scores.

This action substantially eliminates all traces of the ridges formed by the machining and grinding operation to which the work crankshaft 53 had previously been subjected without replacing such ridges by lap-formed irregularities. The ridges are in effect lapped off by the rough and finish lapping elements to a bore line established by uninterrupted metal continuity of the surface operated upon. While it is preferable to so predetermine the linear velocities of the movement of the work crankshaft 53 and movement of the rough or finish lapping elements as to bring the main portions of the scratch lines to approach right-angle relationship with respect to each other, it is found that excellent results are obtained when the angularity of the lines traced during successive half cycles of the reciprocatory movement is such that the minimum angle therebetween is substantially forty degrees. In other words, the resultant of the movement of the work and movement of the lapping element may vary from inclinations of substantially twenty to substantially seventy degrees to the path of reciprocatory movement.

The foregoing advantages can be obtained during both the rough and finish lapping operations while these operations are being performed by a single machine which is particularly adapted to facilitate the convenient alternative rough lapping and finish lapping operations.

A lapping tool of the same character shown in the drawings may be utilized to lap the main bearings of a crankshaft without departing from the scope of the invention. To do this, it is not necessary to swingably mount the tool inasmuch as the main bearings do not revolve. This can be conveniently accomplished by supporting the main bearing lapping tools on the corresponding main bearings of the master crankshafts 20 so as to enable simultaneous lapping of the crankshaft throw and main bearings of the crankshaft and to facilitate simultaneous shifting from a rough lapping to a finish lapping on all the crankshaft bearings.

Various modifications and changes may be effected in the application without departing from the scope of the invention or from the scope of the appended claims.

What we claim is:

1. Crankshaft lapping apparatus including a machine bed structure, means thereon for rotatively supporting a crankshaft to be lapped on its normal axis, a pair of master crankshafts rotatively mounted by said means about axes substantially parallel to said normal axis and each being substantially identical in crank throw arrangement to said crankshaft to be lapped, means for driving said master and said work crankshafts in synchronism with each other, a lapping tool supported by said master crankshafts having a pair of lapping units adapted for selective engagement with the crank throw bearing of said work crankshaft, and means for selectively bringing first one and then the other of said lapping tool lapping units into and out of lapping receiving relationship with said work crankshaft.

2. Crankshaft lapping apparatus including a machine bed structure for rotatively supporting a crankshaft to be lapped on its normal axis, a lapping tool having a plurality of lapping units selectively engageable with a crank throw bearing of said crankshaft, and means for supporting said tool and drivingly moving the lapping units thereof independently of said crankshaft through substantially the same path as said crank throw bearing moves during rotation of said crankshaft on said normal axis and while at least one of said lapping tool units is in lapping engagement with said bearing.

3. Crankshaft lapping apparatus including a machine bed structure for rotatively supporting a crankshaft to be lapped on its normal axis, a lapping tool having a plurality of lapping units selectively engageable with a crank throw bearing of said crankshaft, and means for supporting said tool and drivingly moving the lapping units thereof independently of said crankshaft through substantially the same path as said crank throw bearing moves during rotation of said crankshaft on said normal axis and while at least one of said lapping tool units is in lapping engagement with said bearing, said tool supporting and moving means including an element for shiftably attaching said tool thereto and a yieldable means for selectively and yieldably urging one of said lapping units against said crank throw bearing and into and out of lapping engagement with a predetermined pressure.

4. Crankshaft lapping apparatus including a machine bed structure, means thereon for rotatively supporting a crankshaft to be lapped on its normal axis, and a lapping tool adjacent said crankshaft having a pair of lapping units selectively engageable with the same crank throw bearing of said crankshaft, supporting means for supporting said crankshaft independently of said tools and for rotating said crankshaft on said normal axis and while one of the lapping units of one of said tools is in lapping engagement with said bearing, and means for selectively bringing first one and then the other of said lapping tool lapping units into and out of lapping engagement with said bearing.

5. Crankshaft lapping apparatus including a machine bed structure, means thereon for rotatively supporting a crankshaft to be lapped on its normal axis, a lapping tool having a pair of lapping units each engageable with and embracing not more than one-half the circumference of a crank throw bearing of said crankshaft, support means for supporting said tool independently of said crankshaft, supporting means for supporting said crankshaft and for revolving said crank throw bearing during rotation of said crankshaft on said normal axis while one of said lapping units of said tool is in lapping engagement with said bearing, and means for selectively shifting first one and then the other of said lapping tool lapping units into and out of lapping engagement with said bearing.

6. Crankshaft lapping apparatus including a machine bed structure, means thereon for rotatively supporting a crankshaft to be lapped on its normal axis, a lapping tool having a pair of lapping elements engageable with a crank throw bearing of said crankshaft, means independent of said crankshaft for supporting said tool, means for drivingly reciprocating said elements at a rate approaching a vibratory order and means for bringing first one and then the other of said lapping tool lapping elements into and out of lapping receiving relationship with said work crankshaft during rotation of said crankshaft.

7. Crankshaft lapping apparatus including a machine bed structure, means thereon for rotatively supporting a crankshaft to be lapped on its normal axis, a lapping tool swingably mounted on said bed structure and adapted to follow the movement of a crank throw bearing of said crankshaft having a pair of reciprocable lapping elements selectively engageable with a crank throw bearing of said crankshaft, means for reciprocatively supporting said elements, and means for alternately bringing first one and then the other of said lapping tool elements into and out of lapping engagement with said bearing.

8. Crankshaft lapping apparatus including a machine bed structure, means thereon for rotatively supporting a crankshaft to be lapped on its normal axis, a lapping tool adjacent said crankshaft having a plurality of lapping elements adapted for reciprocatory travel and engageable with a bearing of said crankshaft, and means for selectively bringing first one and then the other of said lapping elements and said bearing into and out of lapping receiving relationship during rotation of said crankshaft.

9. Crankshaft lapping apparatus including a machine bed structure, means thereon for rotatively supporting a crankshaft to be lapped on its normal axis, a pair of master crankshafts rotatively mounted by said means about axes substantially parallel to said normal axis and each being substantially identical in crank throw arrangement to said crankshaft to be lapped, means for driving said master and said work crankshafts in synchronism with each other, a lapping tool supported by said master crankshafts having a plurality of lapping elements adapted for reciprocatory travel and engageable with a bearing of said work crankshaft, and means for selectively urging at a predetermined lapping pressure first one and then the other of said lapping elements and said bearing into and out of lapping receiving relationship.

10. Crankshaft lapping apparatus including a support, means thereon for rotatively supporting a multiple throw crankshaft to be lapped, a plurality of lapping tools each having a pair of lapping elements selectively engageable with one of the crank throw bearings of said crankshaft, and means for selectively and simultaneously urging together at a predetermined lapping pressure one of said elements of each of said tools and one of said bearings.

11. Crankshaft lapping apparatus including a support, means thereon for rotatively supporting the crank throw bearings of a multiple throw crankshaft to be lapped, a pair of master crankshafts rotatively mounted about axes substantially parallel to the normal axis of said work crankshaft and each being substantially identical in crank throw arrangement to said work crank, means for driving said master and said work crankshafts in synchronism with each other, a plurality of lapping tools each having a plurality of lapping elements engageable with one of the crank throw bearings of said work crankshaft, and means for selectively and simultaneously urging together at a predetermined lapping pressure one of said elements of each of said tools and one of said bearings.

12. A lapping tool for a lapping apparatus comprising a driving member, a pair of spaced eccentrics drivingly connected to said member, a pair of reciprocative lapping elements positioned in spaced facing relationship, and means for reciprocating said elements in response to movement of said eccentrics.

13. A crankshaft lapping apparatus including a support for rotatively supporting a crankshaft to be lapped, a lapping tool having a plurality of lapping elements selectively engageable with a crank throw bearing of said crankshaft, means for supporting said tool and drivingly moving said lapping elements through substantially the same path as said crank throw bearing moves during rotation of said crankshaft on said axis and independently of said crankshaft, means for simultaneously reciprocating said lapping elements relative to the major part of said tool and mechanism for selectively moving first one and then the other of said lapping elements into engagement with said bearing.

14. Lapping apparatus comprising means for rotatably supporting a piece of work, a lapping tool comprising a pair of lapping units each selectively engageable with said work, said units each having a reciprocable lapping element, means for shiftably mounting said tool to accommodate said alternate movement for bringing first one and then the other of said lapping elements into engagement with said work, and means on said tool for simultaneously drivingly reciprocating the lapping element of each of said units.

15. A tool for abrading apparatus comprising a driving member, a pair of movable abrading elements positioned in spaced facing relationship, means for movably supporting said abrading elements in spaced positions between which a piece of work is receivable, said abrading elements being selectively engageable with said work, means operatively connected with said driving member and each of said abrading elements respectively for producing abrading movement thereof, and mechanism operatively connected with said first mentioned means for selectively moving each of said abrading elements respectively toward and away from said work, said mechanism including a fluid pressure actuating member adapted to yieldably urge said elements against said work.

16. Crankshaft lapping apparatus including a machine bed structure for rotatively supporting a crankshaft to be lapped on its normal axis, a lapping tool having a lapping element adapted for engagement with the crank throw bearing of said crankshaft, and means for supporting said tool and drivingly moving the lapping element thereof independently of said crankshaft as said crank throw bearing moves during rotation of said crankshaft on said normal axis while said lapping element is in lapping engagement with said bearing, and means selectively shifting said lapping element toward and away from said bearing respectively including a fluid pressure actuated member adapted to yieldably engage said lapping element and bearing and to vary the lapping engagement pressure of said bearing and said lapping element during movement of said crankshaft and said tool.

17. Lapping apparatus comprising means for rotatably supporting a piece of work, a lapping tool comprising a pair of lapping elements each selectively engageable with said work, means for shiftably mounting said tool to accommodate selective movement of said lapping elements into engagement with said work, and means for variably limiting the movements of each of said lapping elements respectively toward said work for predetermining the depth of cut performed by each of said lapping elements during rotation of said work.

DAVID A. WALLACE.
EDWARD C. LEE.